United States Patent [19]

Talmage et al.

[11] 4,071,689
[45] Jan. 31, 1978

[54] LUCENT ELECTROGRAPHIC SENSOR FOR DETERMINING PLANAR COORDINATES

[75] Inventors: John E. Talmage; L. Dexter Bates, both of Oak Ridge, Tenn.

[73] Assignee: Elographics, Incorporated, Oak Ridge, Tenn.

[21] Appl. No.: 727,153

[22] Filed: Sept. 27, 1976

[51] Int. Cl.² .................................... G08C 21/00
[52] U.S. Cl. .................................... 178/18
[58] Field of Search .................... 178/18, 19

[56] References Cited

U.S. PATENT DOCUMENTS

| | | | |
|---|---|---|---|
| 3,632,874 | 1/1972 | Malavard et al. | 178/18 |
| 3,758,718 | 9/1973 | Fletcher et al. | 178/18 |
| 3,798,370 | 3/1974 | Hurst | 178/18 |
| 3,857,022 | 12/1974 | Rebane et al. | 178/18 |

Primary Examiner—Thomas A. Robinson
Attorney, Agent, or Firm—Martin J. Skinner

[57] ABSTRACT

An electrographic sensor for determining planar coordinates is described whereby graphical material to be analyzed may be placed beneath, or projected against, the rear surface of the sensor. This sensor is of particular value for placing on the face of a cathode ray tube. The sensor includes a rigid, optically transparent substrate having an extremely uniform, substantially transparent resistive layer applied to one surface, small electrodes in contact with the resistive layer and individual resistors connected between adjacent electrodes to produce a resistance network around the perimeter of the substrate. Means are provided to produce orthogonal electrical fields in the resistive layer whereby the contacting of the resistive layer with a conductive stylus produces voltage signals at the stylus which are proportional to the coordinates of the point of contact. The second surface of the substrate may be made translucent for projecting optical images thereagainst.

7 Claims, 3 Drawing Figures

LUCENT ELECTROGRAPHIC SENSOR FOR DETERMINING PLANAR COORDINATES

BACKGROUND OF THE INVENTION

Our invention relates generally to a system for graphical data interpretation, storage, transmission and the like, and more particularly to an electrographic sensor which may be placed over graphical data to be analyzed or have the graphical data optically projected against the rear surface of the sensor. The term "graphical data" as used herein, is any source of information presentable in two dimensions. In addition, the term "lucent" is defined to cover all transparencies from clear to translucent (see Webster's Dictionary). The term "processed," as used in conjunction with data, is intended to cover interpretation, storage, transmission and the like.

Considerable effort has been expended in recent years toward apparatus for graphical data processing. Many of the devices developed for this purpose utilize orthogonal electrical fields in a sensor unit together with a probe that is movable across the sensor to derive a signal proportional to the position of the probe. These signals may be in analog or digital form. The most pertinent prior art known to us are the devices described in U.S. Pat. No. 3,632,874 issued to Lucien C. Malavard on Jan. 4, 1972, and U.S. Pat. No. 3,798,370 issued to George S. Hurst on Mar. 19, 1974.

The patent to Hurst teaches a construction of an electrographic sensor whereby very accurate position-related signals can be obtained. This involves the use of spot electrodes along the edge of an opaque resistive paper in the sensor, and discrete resistors connected between adjacent electrodes to form resistor networks across which voltages are applied to produce uniform orthogonal electric fields. However, the structure can only be used to process data placed on top of the sensor. This prevents its use in such applications as those associated with cathode ray display tubes or optical projection from the rear of any sort.

In the patent to Malavard, one embodiment is described for copying graphical data. He specifically mentions cathode ray display tubes. No teaching is given in the patent, however, as to the composition of the "thin conduction layer" applied to the "substrate." Whatever the composition, the transparency of the sensor is reduced substantially according to his admission. Also, Malavard does not teach how he would produce the terminals along the edge of the unit. Furthermore, he teaches the use of a graphite stylus to contact the sensor. We know from previous experience that this is damaging to surfaces and causes a relatively short sensor lifetime.

Accordingly, no suitable transparent and highly accurate electrographic sensor was known in the art. Furthermore, no sensor was known whereby projected images of data could be processed.

SUMMARY OF THE INVENTION

Our electrographic sensor comprises a rigid sheet of an optically transparent substrate having applied to one surface thereof a substantially transparent, stable, adherent abrasion-resistant layer having a uniform sheet resistivity of about 100–3000 ohms per square, and a resistor network along each edge of the substrate in contact with the resistive layer at specific positions. These resistor networks may be produced using a plurality of small electrodes spaced along the edges of the substrate in contact with the resistive layer and individual resistors connected between adjacent electrodes as taught in the Hurst patent. The substrate is mounted within a suitable frame, and circuitry is utilized to apply voltages to the resistor networks in a manner to produce orthogonal electric fields in the resistive layer. A non-abrasive conductive member, used to contact the resistive layer at desired data positions, is connected to the circuitry whereby voltage signals are produced that relate to the position of contact of the member on the sensor. The conductive member may be, for example, a stylus-type probe having a conductive core and an insulating shell. If desired, the opposite surface of the substrate may be frosted or etched to permit projecting images thereagainst.

In a preferred embodiment, the substrate is glass and the resistive layer is a very uniform deposit of a semiconducting metal oxide.

DETAILED DESCRIPTION

Figure 2:
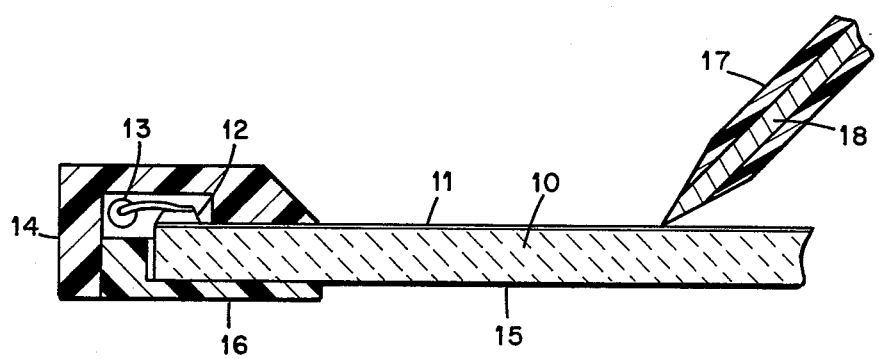
FIG. 2 is an enlarged cross sectional drawing illustrating our improved electrographic sensor.

Our invention may best be understood by reference to FIG. 2. A glass plate 10 has a durable (e.g., adherent and chemically-stable) resistive layer 11 permanently applied to one surface thereof, referred to hereinafter as the sensor face. A highly uniform sheet resistance of this layer of a selected value in the range of about 100–3000 ohms per square is suitable; however, a uniform selected resistivity in the range of 100–500 ohms per square is preferred. The resistive layer 11 must be substantially transparent, i.e., have a transparency of at least 60% and preferably 90% of the transparent substrate. A layer having these characteristics can be produced by the deposition of various semiconducting metal oxides, such as indium oxide or indiumtin oxide, upon the glass sheet. A product of this type may be obtained, for example, from Optical Coating Laboratory, 2798 Geffen Ave., Santa Rosa, Ca. This product (LC-4004 Rev. C "Transparent Indium Oxide") is marketed in sheets 1/16 to ¼ in. (0.16 to 0.635 cm) thick and, for example, 11.5 in. wide and 16 in. long (approx. 30 × 40 cm) with a coated area of 10.8 × 16 inches (27.4 × 40 cm). An area of about 8.5 × 11 inches (approx. 22 × 28 cm) has a very uniform (±1%) resistivity of about 100 ohms per square.

Although the transparent substrate of our sensor has been glass in the above-stated description, other transparent substrate materials may be used. For example, a suitable resistive layer may be applied to sheet forms of acrylic plastic and the like.

Near the edge of the glass 10, but in contact with the resistive layer 11, are a plurality of spot electrodes 12. These electrodes 12 are typically 1/32 to   in. (0.08 – 0.32 cm) in diameter and spaced apart about 1 to 2 inches (2.5 – 5.0 cm) (see FIG. 1). A conductive paint may be applied with a screen or mask to produce these electrodes on the resistive layer. Uniform spacing between the spot electrodes is most convenient and is perferred. Connected between adjacent electrodes are resistors 13 to form resistor networks along each edge of the glass 10 as taught in the Hurst patent. The values of the resistors are determined by the resistivity of the layer on the glass. In general, their value is about 1/100 to 1/20 of the resistivity; e.g., 5 ohms for 100 ohm per square of the resistive layer. A precision of at least 1% is preferred.

The glass is mounted in a suitable frame 14 whereby the electrodes 12 and the resistors 13 are protected but the major portion of the glass 10 is exposed on both surfaces, i.e., the sensor face 11 and a rear surface 15. This rear surface 15 may be untreated, for example, or etched to produce a screen upon which images may be projected from slides or other optical systems. The glass 10 may be held in frame 14 with an insert 16 around the perimeter.

Also shown in this figure is a probe 17 for use in the contacting of the resistive layer 11. This probe has a conductive core 18 so that the resistive layer may be electrically connected to voltage measuring circuits (not shown) for purposes described hereinafter.

It will be understood that the resistor networks along each edge of the resistive layer may be produced by means other than the spot electrodes and individual resistors. A typical alternative is the deposition of areas of resistive material having a substantially lower resistance than that of the resistive layer. For example, a ribbon of gold may be vapor deposited to provide the desired results.

In still another embodiment, the glass with its resistive layer is removable from the resistor network. This is accomplished, for example, by placing the spot electrodes (spot conductive regions) on the resistive layer as above-described. The resistors, in turn, would be joined to contacts at positions corresponding to anticipated positions of the spot electrodes. Physical union of the spot electrodes and the contacts then provides the resistor network connections whereby the necessary orthogonal electrical fields may be applied to the resistive layer.

While various materials may be deposited on the glass to achieve a desired resistivity, indium oxide appears to be highly suitable for the application of our sensor. For example, gold may be vapor-deposited upon the glass; however, it is not abrasion resistant and would have short life as a sensor. Similarly, a graphite layer would not be abrasion resistant. In contrast, a chromium layer is hard and will not scratch. It does, however, oxidize readily and prevents the ready attachment of electrodes. In addition to indium oxide, a uniformly deposited layer of tantalum, tin, antimony (as oxides) or a combined layer of indium oxide and tin oxide can be produced with suitable characteristics for our sensor. Other similar resistive layers that are adherent, chemically stable, and provide a resistance in the range of about 100-3000 ohms per square without excessive reduction in transparency, are suitable for our sensor. In general, nonstoichiometric oxides of metals in Groups III and IV, with metal impurities from adjoining Groups of the Periodic Table of Elements, are suitable.

The nature of the resistive layer, e.g., vapor-deposited indium oxide, on the glass necessitates the use of a nonmarking and nonabrasive conductive probe or stylus 17. We have found that the conductive portion 18 of the stylus 17 may be "Ecco-Shield SV," marketed by Emerson & Cuming, Inc., Canton, Mass. Other potential materials are conductive elastomers and conductive plastics such as those described in Modern Plastics, Mar. 1976, p. 36–41. One such material is marketed by Technical Wire Products, Inc., Cranford, N.Y. None of these materials mark the resistive layer and are substantially nonabrasive.

Figure 1:
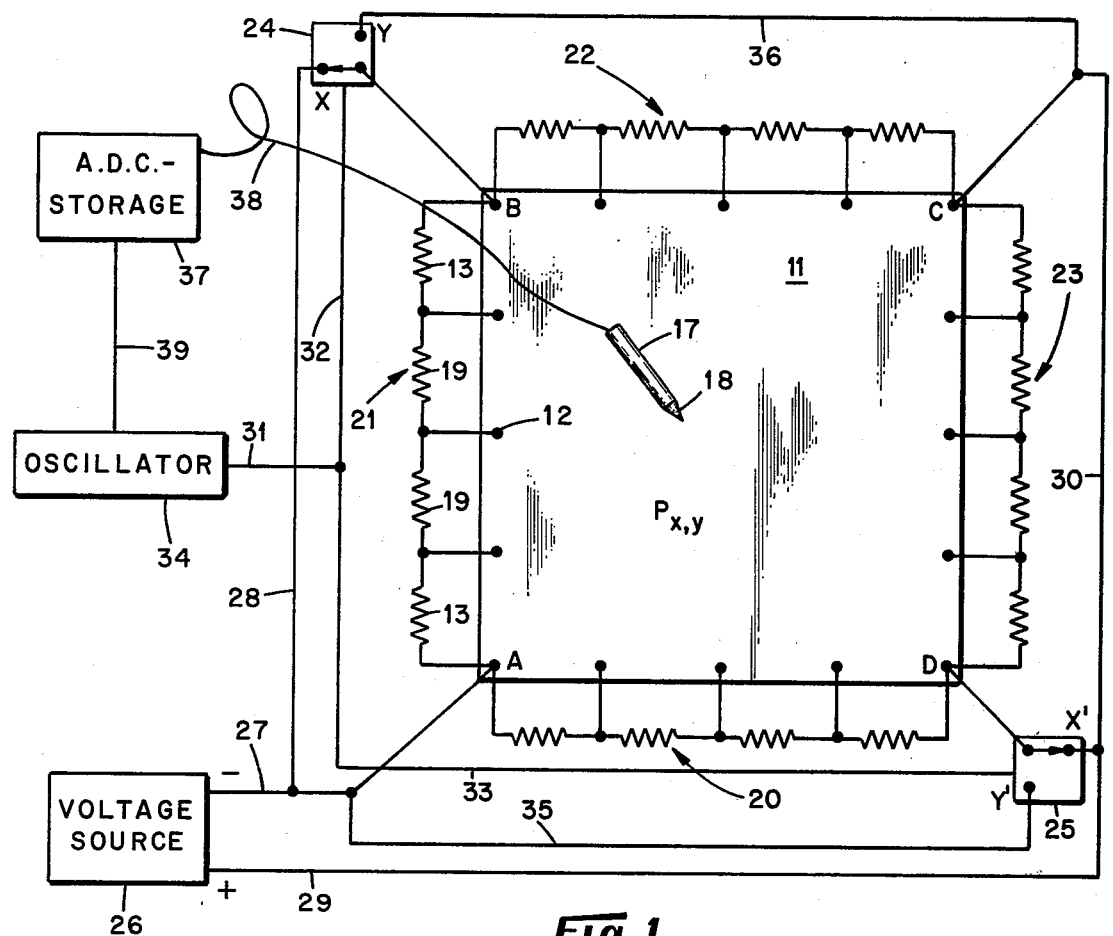
FIG. 1 is a schematic diagram of a simplified circuit that is substantially equivalent to that found in the above-referenced U.S. Pat. No. 3,798,370 for the purpose of permitting a description herein of our invention.

The manner of using our sensor of FIG. 2 is illustrated in FIG. 1. This figure is similar to FIGS. 1 and 4 of the above-cited patent to Hurst. The resistive layer 11 and spot electrodes 12 are illustrated. The corner electrodes are identified as A, B, C, and D for reference purposes hereinafter. Two types of resistors are used: resistors 13 of one value (about 5 ohms) join the corner electrodes A–D to adjacent electrodes; and resistors 19 (only two are shown along an edge for illustration purposes) of a second value (about 4 ohms) are connected between other electrodes 12 along each edge. The total resistors along each edge form resistor networks 20 (from A to D), 21 (from A to B), 22 (from B to C) and 23 (from C to D).

Two solid state switches 24, 25 are used to apply a voltage from source 26 in an orthogonal manner to the resistive layer 11. When switches 24, 25 are moved to contacts X, X', respectively, both ends of resistor network 21 are connected to the negative terminal of source 26 via leads 27, 28 while both ends of resistor network 23 are connected to the positive terminal thereof by leads 29, 30. The resistors of networks 20 and 22 then act as voltage dividers to produce uniform equipotential lines with a gradient in the $x$-direction. In a mutually exclusive time period, switches 24, 25 are moved to positions $y$, $y'$ by a signal on leads 31-33 from oscillator 34. In this position of the switches, all electrodes along resistor network 20 are at a negative potential via leads 27, 35 and all electrodes along resistor network 22 are at a positive potential via leads 29, 30, and 36. During this interval, resistor networks 21, 23 act as voltage dividers to assure a uniform potential gradient in the $y$-direction.

Since the resistive layer 11 is very uniform and the resistors 13, 19 are very precise, the voltage at any point, P, on the resistive layer is proportional to the $x$- and $y$-coordinates of P. Therefore, the conductive core 18 of probe 17 in contact with the resistive layer 11 at point P will convey a voltage to an analog-to-digital convertor (ADC) and storage system 37 through flexible electrical lead 38. The coordinates of point P, in the form of voltages, may be uniquely distinguished ($x$ versus $y$) by the system due to the lead 39 between the oscillator 34 and the ADC-Storage unit 37 as the signal thereon distinguishes the position of the switches 24, 25.

The stylus 17 may be moved at any desired rate across the resistive layer 11 giving rise to time-separated $x$- and $y$-coordinate proportional signals. If the data is to be scanned slowly, the oscillator 34 is operated at a frequency of a few Hertz. At higher frequencies, up to about 1 kHz, the stylus may be moved at a more rapid rate. This will permit, for example, curve following, signature-producing signals, etc.

Figure 3:
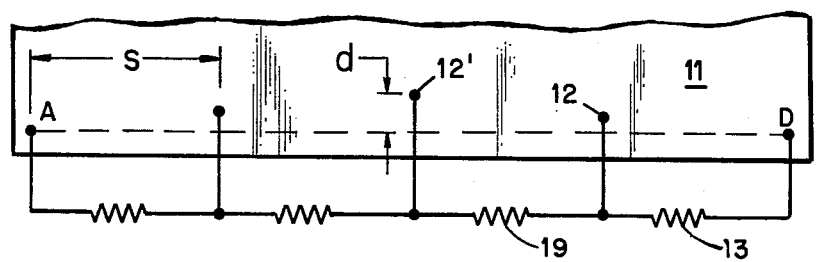
FIG. 3 is a drawing illustrating the preferred location of the electrodes shown in FIG. 1.

As stated above, all spot electrodes connected to a resistor network having both ends thereof connected to the same voltage source terminal have substantially the same potential. The only deviation is caused by a flow of current through resistors 13, 19, for example, due to the potential across resistive layer 11. Exact potentials are required for most applications of the embodiment; therefore, corrections can be made by relocating the edge spot electrodes as shown in FIG. 3. The edge spot electrodes are displaced toward the center of layer 11 a distance, $d$, so as to compensate for the above-described voltage drop through the resistors. Thus, electrode 12 is displaced from a line between corners A and D a distance to overcome the drop through resistor 13, and electrode 12' is farther displaced to overcome the drop through resistors 13 and 19 in series. The displacement distance is thus greatest ($d_{max}$) for edge electrodes farthest from a corner electrode.

The effective displacement distance is such that application of a potential across the resistive layer, through the use of the opposite pairs of resistor networks, produces an equipotential line which is substantially parallel to the line joining the corner spot electrodes when the equipotential line is at least one spot separation, $s$, from the most inwardly displaced electrode, i.e., 12' in FIG. 3. The value of $d$ for each edge electrode is determined from the approximate equation: $d = (\Delta V/V)L$, where $\Delta V$ is the potential drop measured from a corner spot electrode to the particular edge spot electrodes; $V$ is the potential across the entire resistive layer, and $L$ is the distance between oppositely disposed rows of spot electrodes on the sensor.

The principal value of our sensor is being able to place the sensor over graphical information, such as displayed on the face of a cathode ray tube, and through the action of tracing the information with the stylus, convert the data into electrical signals for storage, computation and the like type of data processing. The data being traced also may be that on prepared "hard copy" material that is placed beneath the transparent sensor. Even information of fixed objects may be processed by taking the sensor to the object.

Some other types of data may be processed which cannot be processed by sensors of the prior art. For example, data on sheets larger than the sensor may be processed through the use of optical reduction equipment and the projection of the reduced image against the back of the sensor. For this application, of course, the rear surface is made into a "screen" by frosting, etching, etc. Likewise, small pieces of data may be enlarged and projected against the sensor rear surface to permit data processing.

As stipulated above, one of the most advantageous applications of our sensor is in conjunction with oscilloscopes. The sensor may be used in a manner similar to the use of a "light pen". Data displayed upon the face of the cathode ray tube of the oscilloscope is traced or otherwise processed through the use of our sensor and the information transmitted to a computer for a variety of purposes. If desired, this information may be fed back into the oscilloscope in order to modify the data. However, in contrast to the light pen, which only interacts through an area of light on the cathode ray tube, contact of the stylus on our sensor may be made at any point and the information used to interact with the data. This permits the insertion of hard copy data beneath the sensor and thus the rapid inputting of ancillary data into the computer. Due to the transparency of our sensor, the conventional light pen may also be used, if desired.

The above-described uses of our sensor are given only for illustration and are not intended to limit the applicability of the sensor. Many users will, undoubtedly, recognize applications where our lucent electrographic sensor will uniquely provide for data processing.

We claim:

1. A lucent electrographic sensor for use in determining x- and y-coordinates of a point, which comprises:
    a rigid sheet of transparent substrate;
    a substantially transparent, chemically stable uninterrupted resistive layer of a semiconducting metal oxide adherently deposited on one face of the substrate in an amount to produce a sheet resistivity of a selected value in the range of about 100 to 3000 ohms per square;
    corner spot electrodes in each corner of the sensor in electrical contact with the resistive layer;
    a plurality of spaced-apart edge spot electrodes along each edge of the sensor in electrical contact with the resistive layer;
    a plurality of discrete first resistors connected between adjacent of all of the edge spot electrodes; and
    a plurality of discrete second resistors connected between the corner spot electrodes and adjacent edge spot electrodes whereby the first and second resistors form series resistor networks along each edge of the sensor.

2. The sensor of claim 1 wherein the substrate is glass and the resistive layer has a variation in uniformity of about ±1%.

3. The sensor of claim 2 wherein the resistive layer has a sheet resistivity in the range of 100–500 ohms per square.

4. The sensor of claim 3 wherein the resistive layer is a deposited oxide of metals selected from the group comprising tantalum, indium, tin, antimony and mixtures thereof.

5. The sensor of claim 1 wherein each of the edge and corner spot electrodes is small with respect to the spacing therebetween; wherein the edge spot electrodes along each edge of the sensor are equally spaced from each other electrode along that edge and from the adjacent corner spot electrodes; wherein all of the first resistors are of equal resistance value; and wherein all of the second resistors are equal and each have a resistance value greater than the value of each of the first resistors.

6. The sensor of claim 5 wherein the corner and edge spot electrodes are circular and their diameter is about 1/64 inch; the spacing therebetween is from about 1 inch to about 2 inches; the resistive layer is indium oxide having a selected sheet resistivity in the range of 100 to 200 ohms per square; the first resistors are each of a value of about 4 ohms with a precision of at least 1.0 percent; and second resistors are each about 5 ohms with a precision of at least 1.0 percent.

7. The sensor of claim 5 wherein each of the edge spot electrodes is individually displaced toward the center of the resistive layer, from lines joining the corner spot electrodes, an effective distance such that application of an electrical potential across the resistive layer by opposite pairs of the series resistor networks produces equal potential lines substantially parallel to the lines joining the corner spot electrodes whenever the equipotential lines are at least one spot electrode separation distance from the most inwardly displaced edge spot electrode.

* * * * *